(12) United States Patent
Shido et al.

(10) Patent No.: US 11,556,941 B2
(45) Date of Patent: Jan. 17, 2023

(54) INFORMATION PROCESSING METHOD, COMPUTER-READABLE NON-TRANSITORY STORAGE MEDIUM STORING PROGRAM, AND INFORMATION PROCESSING DEVICE

(71) Applicant: Mercari, Inc., Tokyo (JP)

(72) Inventors: Yusuke Shido, Tokyo (JP); Kazuki Sawada, Tokyo (JP); Kodai Nakamura, Tokyo (JP); Daichi Matsuyama, Tokyo (JP); Ryo Senga, Tokyo (JP); Ryota Tajima, Tokyo (JP); Keito Nakashima, Tokyo (JP)

(73) Assignee: MERCARI, INC., Tokyo (JP)

( * ) Notice: Subject to any disclaimer, the term of this patent is extended or adjusted under 35 U.S.C. 154(b) by 173 days.

(21) Appl. No.: 16/987,586

(22) Filed: Aug. 7, 2020

(65) Prior Publication Data

US 2021/0073832 A1    Mar. 11, 2021

(30) Foreign Application Priority Data

Sep. 5, 2019 (JP) .............................. JP2019-161755

(51) Int. Cl.
*G06Q 30/02* (2012.01)
*G06Q 30/06* (2012.01)

(52) U.S. Cl.
CPC ..... *G06Q 30/0201* (2013.01); *G06Q 30/0623* (2013.01)

(58) Field of Classification Search
CPC .......... G06Q 30/0201; G06Q 30/0623; G06Q 30/0207–30/0277
See application file for complete search history.

(56) References Cited

U.S. PATENT DOCUMENTS

| | | | | |
|---|---|---|---|---|
| 5,873,069 | A | * | 2/1999 | Reuhl .................... G06Q 30/06 705/26.4 |
| 7,996,282 | B1 | * | 8/2011 | Scott .................. G06Q 30/0603 707/752 |
| 9,152,624 | B1 | * | 10/2015 | Krallman ................ G06F 16/00 |
| 9,177,225 | B1 | * | 11/2015 | Cordova-Diba .......... G06T 7/11 |

(Continued)

FOREIGN PATENT DOCUMENTS

| | | | |
|---|---|---|---|
| JP | 2001-167163 A | | 6/2001 |
| JP | 2002-207913 A | * | 7/2002 |
| KR | 2001-0000612 A | * | 1/2001 |

*Primary Examiner* — Thuy N Nguyen
(74) *Attorney, Agent, or Firm* — Sterne, Kessler, Goldstein & Fox P.L.L.C.

(57) ABSTRACT

The present disclosure provides a mechanism for facilitating appropriate pricing for an item to be listed for sale on an electronic commerce platform. In an information processing method, one or a plurality of processors included in an information processing device performs: obtaining first item information of a first item; performing sales evaluations for price ranges of the first item and obtaining evaluation information on the sales evaluations, the sales evaluations being performed based on sales information of second items matched with or similar to the first item, the second items being extracted by using the first item information from among items registered in an electronic commerce platform; and performing control to display the sales evaluations for the price ranges of the first item by using a plurality of regions identifiably on a screen, based on the evaluation information.

8 Claims, 15 Drawing Sheets

(56) References Cited

U.S. PATENT DOCUMENTS

| | | | |
|---|---|---|---|
| 10,515,140 B1* | 12/2019 | Scott | G06F 40/134 |
| 2007/0073580 A1* | 3/2007 | Perry | G06Q 30/02 |
| | | | 705/26.1 |
| 2009/0216633 A1* | 8/2009 | Whitsett | G06Q 30/02 |
| | | | 705/26.1 |
| 2011/0314400 A1* | 12/2011 | Mital | G06F 16/283 |
| | | | 707/769 |
| 2012/0046998 A1* | 2/2012 | Staib | G06Q 30/0206 |
| | | | 705/7.35 |
| 2013/0138477 A1* | 5/2013 | Wilkins | G06Q 30/0629 |
| | | | 705/7.29 |
| 2014/0032274 A1* | 1/2014 | Jensen | G06Q 30/02 |
| | | | 705/7.35 |
| 2014/0032362 A1* | 1/2014 | Frayman | G06Q 30/0633 |
| | | | 705/26.8 |
| 2014/0040747 A1* | 2/2014 | Gardenfors | G06F 3/0482 |
| | | | 715/728 |
| 2014/0067613 A1* | 3/2014 | Singhal | G06Q 30/0641 |
| | | | 705/26.62 |
| 2014/0108097 A1* | 4/2014 | Gange | G06Q 30/0206 |
| | | | 705/7.35 |
| 2014/0304059 A1* | 10/2014 | Wang | G06Q 30/0234 |
| | | | 705/14.34 |
| 2014/0358629 A1* | 12/2014 | Shivaswamy | G06Q 10/087 |
| | | | 705/7.29 |
| 2015/0012381 A1* | 1/2015 | Lazaro | G06Q 30/0633 |
| | | | 705/26.8 |
| 2015/0186975 A1* | 7/2015 | Vierra | G06Q 30/0627 |
| | | | 705/26.63 |
| 2015/0186976 A1* | 7/2015 | Ohkubo | A63F 13/69 |
| | | | 705/26.7 |
| 2015/0262282 A1* | 9/2015 | Walti | G06Q 30/0631 |
| | | | 705/26.7 |
| 2015/0348099 A1* | 12/2015 | Churchill | G06Q 30/0253 |
| | | | 705/14.51 |
| 2017/0109767 A1* | 4/2017 | Shpanya | G06Q 30/0283 |
| 2018/0247363 A1* | 8/2018 | Agarwal | G06Q 30/0629 |
| 2020/0051159 A1* | 2/2020 | Ram | G06F 3/04842 |

* cited by examiner

Fig. 4

| ITEM NAME | FIRST PRICE RANGE | SECOND PRICE RANGE | THIRD PRICE RANGE | FOURTH PRICE RANGE |
|---|---|---|---|---|
| BICYCLE | ¥1,500～20,000 | ¥20,000～30,000 | ¥30,000～45,000 | ¥45,000～ |

Fig. 5

| USER ID | USER INFORMATION | | | |
|---|---|---|---|---|
| | NAME | ADDRESS | PHONE NUMBER | |
| U01 | YAMADA TARO | TOKYO·· | 090 ··· | ··· |
| U02 | SATO HANAKO | YAMANASHI·· | 080 ··· | ··· |
| U03 | TANAKA ICHIRO | OSAKA·· | 090 ··· | ··· |
| ··· | ··· | ··· | ··· | ··· |

Fig. 6

| SELLER ID | ITEM NAME | DESCRIPTION | PRICE | CONDITION | STATUS | PURCHASER ID |
|---|---|---|---|---|---|---|
| U10 | BICYCLE | VEHICLE、xxx、yy y、… | ¥50,000 | GOOD | TRANSACTION IN PROGRESS | — |
| U14 | BAG | HANDBAG、z z、… | ¥70,000 | FAIR | COMPLETED | U26 |
| U34 | ABC574 | SHOES、… | ¥4,600 | VERY GOOD | TRANSACTION IN PROGRESS | — |
| … | … | … | … | … | … | … |

US 11,556,941 B2

INFORMATION PROCESSING METHOD, COMPUTER-READABLE NON-TRANSITORY STORAGE MEDIUM STORING PROGRAM, AND INFORMATION PROCESSING DEVICE

BACKGROUND OF THE INVENTION

Field of the Invention

The present disclosure relates to an information processing method, a computer-readable non-transitory storage medium storing a program, and an information processing device.

Description of the Related Art

On an electronic commerce platform such as a customer-to-customer (C2C) marketplace, a system for mediating personal trading has been conventionally disclosed (for example, refer to Japanese Patent Laid-Open No. 2001-167163).

However, on the electronic commerce platform, it is difficult for a user to set a fair price for an item even though wanting to list the item for sale. In such pricing, the user determines the price by grasping the fixed price of the item, grasping its market prices on some electronic commerce platforms, and then taking those prices into account. However, under the present circumstances, it takes much time and effort and further, pricing is performed while it is uncertain whether the pricing is appropriate.

It is an object of the present disclosure to provide an information processing method, a computer-readable non-transitory storage medium storing a program, and an information processing device that can provide a mechanism facilitating appropriate pricing for an item that is to be listed for sale on an electronic commerce platform.

SUMMARY OF THE INVENTION

In an information processing method according to one embodiment of the present disclosure, one or a plurality of processors included in an information processing device performs: obtaining first item information of a first item; performing sales evaluations for price ranges of the first item and obtaining evaluation information on the sales evaluations, the sales evaluations being performed based on sales information of second items matched with or similar to the first item, the second items being extracted by using the first item information from among items registered in an electronic commerce platform; and performing control to display the sales evaluation for the price ranges of the first item by using a plurality of regions identifiably on a screen, based on the evaluation information.

Advantageous Effects of Invention

The disclosed technology can provide a mechanism that facilitates appropriate pricing for an item to be listed for sale on an electronic commerce platform.

BRIEF DESCRIPTION OF THE DRAWINGS

FIG. 4 is a view showing one example of evaluation information according to the embodiment;

FIG. 5 is a view showing one example of user data 233 according to the embodiment;

FIG. 6 is a view showing one example of item data 234 according to the embodiment;

DETAILED DESCRIPTION OF THE PREFERRED EMBODIMENTS

Hereinafter, embodiments of the present disclosure will be described in detail with reference to drawings. It should be noted that the same elements are denoted by the same reference signs to omit redundant explanations.

EMBODIMENTS

In accordance with an embodiment, a device or system will be described in which when a user inputs information on an item to be listed for sale on a portable terminal or the like, sellability for prices of the item is identifiably displayed. For example, when a slider is used as an object for identifiably displaying the sellability, the user can dynamically grasp the sellability for each price corresponding to a knob of the slider by moving the knob.

<Application Example of System>

Figure 1:
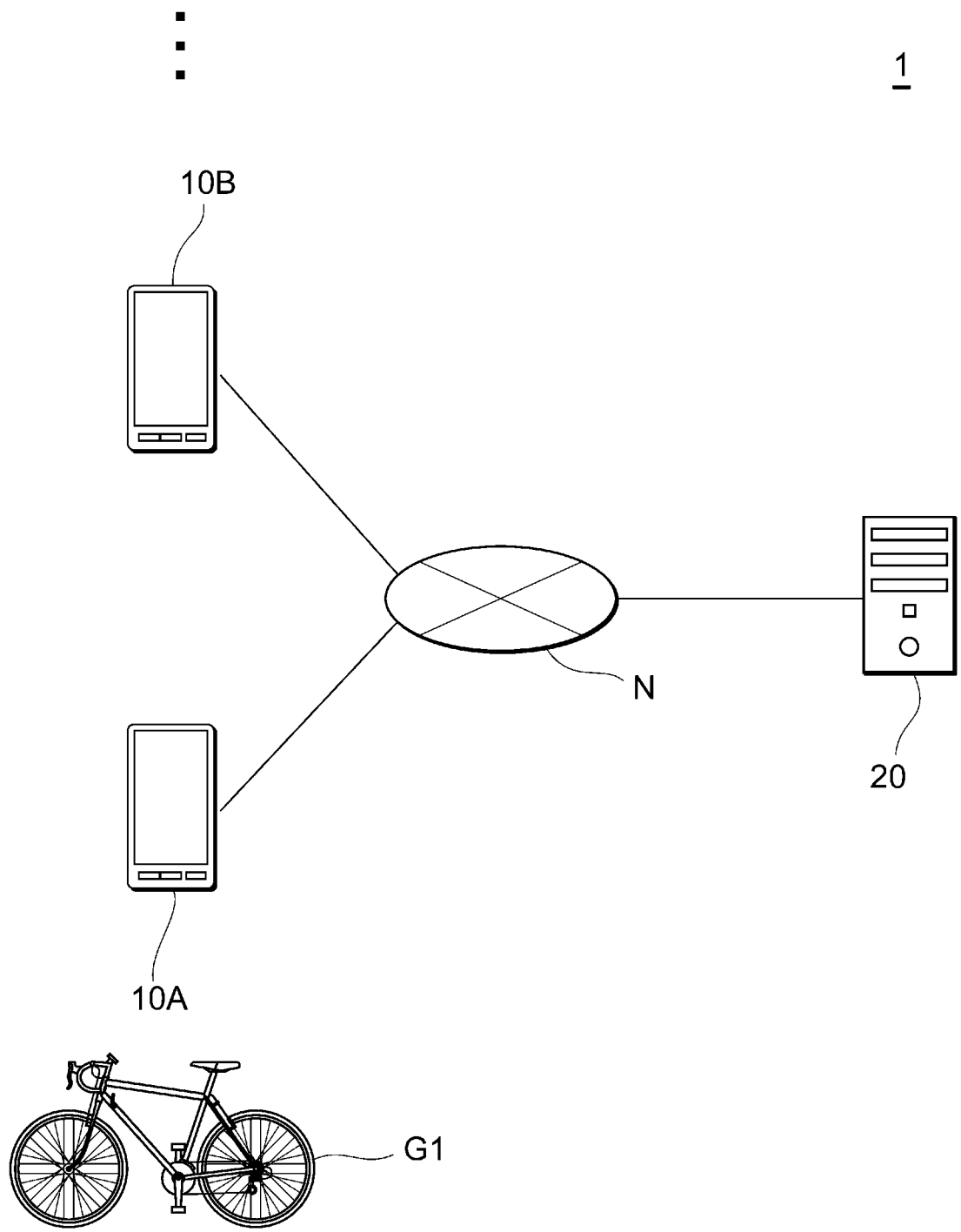
FIG. 1 is a view showing each configuration example of an information processing system 1 according to an embodiment.

FIG. 1 is a view showing each configuration example of an information processing system 1 according to the embodiment. In an example shown in FIG. 1, information processing devices 10A and 10B which are used by respective users and a server 20 which manages an electronic commerce platform are connected via a network N. It should be noted that any number of information processing devices 10A and 10B are connected to the network N.

The information processing devices 10A and 10B are, for example, a smart phone, a portable phone (feature phone), a computer, a personal digital assistant (PDA), and the like; and each includes an internal or external imaging device. The information processing devices 10A and 10B are also represented as an information processing device 10 or a user terminal 10 when not specifically discriminated.

An information processing device 20 is, for example, the server; and may be constituted of one or a plurality of devices. In addition, the information processing device 20 manages the electronic commerce platform, and performs sales evaluations for price ranges of an item based on sales information of the item. Hereafter, the information processing device 20 is also represented as the server 20.

In an example shown in FIG. 1, the user terminal 10 receives an input of item information of an item to be listed for sale. The item information may be input such that image data including the item is input by imaging the item by an imaging device 160 or input is performed using a touch panel or the like by the user. The input item information is transmitted to the server 20.

The server 20 extracts similar or matched items by using the received item information and analyzes the extracted similar items while separating them into those being listed and those sold. The server 20 evaluates sellability of the item from a result of the analysis and transmits information on this evaluation to the user terminal 10. The user terminal 10 identifiably displays the sellability, unsellability, and the like of the item according to its price based on the received evaluation information, by using a slider, or the like on a screen. Thus, the user can be provided with a mechanism allowing appropriate pricing.

<One Example of Configuration>

Figure 2:
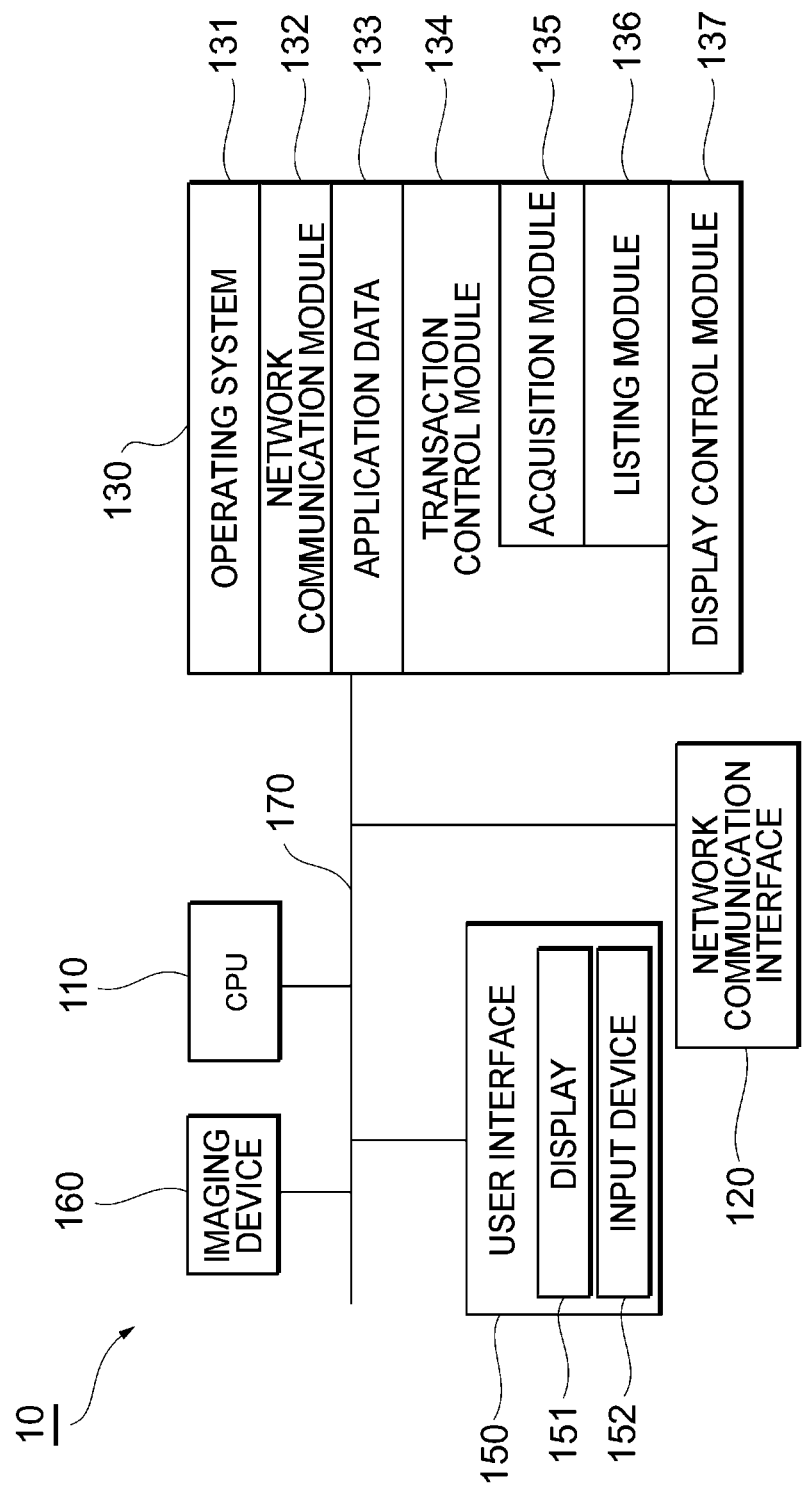
FIG. 2 is a block diagram showing one example of a user terminal 10 according to the embodiment.

FIG. 2 is a block diagram showing one example of the user terminal 10 according to the embodiment. The user terminal 10 includes: one or a plurality of processing devices (CPU) 110; one or a plurality of network or other communication interfaces 120; a memory 130; a user interface 150; an imaging device 160; and one or a plurality of communication buses 170 for interconnecting these components.

The user interface 150 includes, for example, a display device 151 and an input device (keyboard and/or mouse or any other pointing device or the like) 152. The user interface 150 may be a touch panel.

The memory 130 includes a high-speed random access memory such as DRAM, SRAM, DDR RAM or other random access solid-state storage devices; and it may include a nonvolatile memory such as one or a plurality of magnetic disk storage devices, optical disk storage devices, flash memory devices, or other nonvolatile solid-state storage devices.

In addition, another example of the memory 130 may include one or a plurality of storage devices which is installed remotely from the CPU 110. In some embodiments, the memory 130 stores the following programs, modules, and data structures, or a subset of them.

An operating system 131 includes, for example, procedures for processing various basic system services and performing tasks using hardware.

A network communication module 132 is used, for example, for connecting the user terminal 10 to other computers via the one or the plurality of network communication interfaces 120 and one or a plurality of communication networks such as the Internet, other wide-area networks, local area networks, metropolitan area networks, and the like.

Application data 133 includes data that is processed when the user uses an electronic commerce transaction platform. For example, the application data 133 includes user information and information which is obtained from the server 20. Specifically, the application data 133 includes evaluation information on the price of an item. This evaluation information is described later by using FIG. 4.

A transaction control module 134 controls a transaction such as selling and buying of an item on an electronic commerce platform provided by the server 20. For example, the transaction control module 134 includes an acquisition module 135 and a listing module 136 that perform processing for listing an item.

The acquisition module 135 obtains item information (hereinafter, also referred to as "first item information") of an item to be listed for sale by the user (hereinafter, also referred to as a "first item"). The first item is one that can be traded on the electronic commerce platform; and the item information includes information for describing the item; for example, the image data, name, category, brand, condition, and price of the item. The first item information is transmitted to the server 20.

The acquisition module 135 obtains the image data from the imaging device 160 and performs control to transmit this image data to the server 20. The server 20 side may obtain other item information by recognizing the image data. When the server 20 side has not obtained the other item information sufficiently, the acquisition module 135 may make the user input the item information on receipt of a request to obtain the item information.

In addition, the acquisition module 135 obtains evaluation information that indicates sellability evaluated according to the price ranges of the first item from the server 20. The evaluation information includes information on sales evaluations for the price ranges of the first item. The sales evaluation is performed based on sales information of second items matched with or similar to the first item which are extracted by the server 20, by using the first item information from among items registered in the electronic commerce platform. The sales information includes: for example, a listing status indicating being listed or being sold out; and the price of an item on the list or when sold.

The display control module 137 performs control to display the sales evaluations for the price ranges of the first item by using a plurality of regions identifiably on the screen, based on the obtained evaluation information. For example, the display control module 137 identifiably displays each of the regions by using display objects such as a graph and a slider which include the regions corresponding to the respective plurality of price ranges.

Specifically, the evaluation information includes information that is obtained by classifying the prices of the second items, from the lowest to the highest, into a plurality of price ranges and evaluating sellability at multiple stages according to the price ranges. In this case, the display control module 137 makes the price ranges correspond to a plurality of consecutive regions and performs display control so as to make a boundary of each of the regions identifiable. For example, when sellability is different between a first price range from 1000 yen to 2000 yen and a second price range from 2000 yen to 3000 yen, the display control module 137 makes a boundary between a region corresponding to the first price range and a range corresponding to the second price range identifiable.

In the above identifiable display, the price ranges for which the sellability of the item has been evaluated are identifiably displayed on the screen. Thus, a mechanism that facilitates appropriate pricing for an item to be listed for sale can be provided on the electronic commerce platform. By viewing this identifiable display, the user can easily grasp sellability with respect to pricing.

In addition, the display control module 137 may perform control to display, on the plurality of regions, an object movable over the plurality of regions (hereinafter, also referred to as a "moving object"). In this case, the display control module 137 may perform control to display, on the screen, an evaluation result for a price according to a position of the moving object. For example, when a slider including a plurality of regions is displayed as a display object, a knob moving on a bar of this slider corresponds to the moving object. In addition, when a pie chart is used as a display object, an object movable in a circumferential direction corresponds to the moving object.

The moving object is thus provided, so that the user can adaptively grasp sellability at a price corresponding to the position of the moving object while moving the moving object.

In addition, the display control module 137 may change the distinctiveness of the moving object according to the distinctiveness of a region at a position corresponding to the position of this moving object. For example, the display control module 137 may match an attribute of distinctiveness of the moving object to an attribute of distinctiveness of a region where the moving object is positioned. Specifically, in a case where a first region is composed of a first color and a second region is composed of a second color, the moving object is composed of the first color in the first region and is composed of the second color in the second region.

Thus, the distinctiveness of the moving object is also changed according to the region and therefore, the user can adaptively grasp sellability at a price selected by the moving object while viewing a change in the distinctiveness of the moving object.

The listing module 136 executes processing for performing listing processing of the first item by using a price corresponding to the position of the moving object. For example, when a price corresponding to the position of the moving object is 2000 yen, the listing module 136 sets the price of the first item to 2000 yen by the user pressing a listing button which is displayed on the same screen; and proceeds with the listing processing.

Thus, a mechanism can be provided in which pricing is performed by viewing evaluations on sales while moving a price when listed. The user can grasp sellability corresponding to an appropriately changing price before pricing and therefore, can set a price with understanding.

In addition, the acquisition module 135 may obtain, for each of a plurality of time periods, evaluation information corresponding to the time period. For example, the acquisition module 135 may obtain evaluation information which is obtained from evaluation for each of the AM, PM, midnight, and other time periods. This is because there is a possibility that a sellable price range changes according to the time period, based on a statistical tendency indicating that business-related items are easily sellable in a commuting time period and housewife-related items are easily sellable in the afternoon. In this case, the display control module 137 may perform control to identifiably display the plurality of regions based on corresponding evaluation information for each of the time periods. For example, the display control module 137 may perform control to display a slider indicating a price evaluation for each of the time periods (for example, see FIG. 14).

This allows the user to be notified of evaluations for prices in terms of the time period and thus, a mechanism that further facilitates pricing for an item to be listed for sale can be provided.

In addition, the acquisition module 135 may obtain, for each condition of the first item, evaluation information corresponding to the condition. For example, the acquisition module 135 may obtain evaluation information which is obtained from evaluation for each of the item conditions of very good, good, fair, and the like. This is because a sellable price range changes according to the conditions. In this case, the display control module 137 may perform control to identifiably display the plurality of regions based on corresponding evaluation information for each of the item conditions. For example, the display control module 137 may perform control to display a slider indicating a price evaluation for each of the conditions (for example, see FIG. 15).

This allows the user to be notified of evaluations for price in terms of the item conditions and thus, a mechanism that further facilitates pricing for an item to be listed for sale can be provided.

In addition, the display control module 137 may represent the distinctiveness of the plurality of regions by using different color information, or character information, patterns, shapes, or the like. For example, the display control module 137 may display each of the regions on the bar of the slider, with each different color. In addition, the display control module 137 may perform control to display a result of an evaluation for a price corresponding to the position of the knob and/or for the sellability at the price.

Thus, the price ranges for which the sellability of the item has been evaluated are identifiably displayed on the screen, so that a mechanism that facilitates appropriate pricing for an item to be listed for sale can be provided on the electronic commerce platform.

In addition, since the price range differs for each item and a sellable price range differs, the display control module 137 may adaptively change the size of each region according to evaluation information for each item and may change the lowest price and the highest price. This allows the user to be notified of an adaptive evaluation result according to an item.

The one or the plurality of processing devices (CPU) 110 reads each of the modules from the memory 130 as required, and executes it. For example, the one or the plurality of processing devices (CPU) 110 may execute the network communication module 132 which is stored in the memory 130, thereby constituting a communication unit. In addition, the one or the plurality of processing devices (CPU) 110 may execute the transaction control module 134, the acquisition module 135, the listing module 136, and the display control module 137 which are stored in the memory 130, thereby constituting a transaction control unit, an acquisition unit, a listing unit, and a display control unit, respectively. Furthermore, processing of each of the transaction control module 134, the acquisition module 135, the listing module 136, and the display control module 137 may be executed by the one or the plurality of processing devices (CPU) 110.

In other embodiments, the transaction control module 134, the acquisition module 135, the listing module 136, and the display control module 137 may be standalone applications stored in the memory 130 of the user terminal 10. Standalone applications are not limited but include a transaction control application, an acquisition application, a listing application, and a display control application. In yet other embodiments, the transaction control module 134, the acquisition module 135, the listing module 136, and the display control module 137 may be add-ons or plug-ins to other applications.

Each of the above-described components may be stored in the one or the plurality of storage devices mentioned earlier. Each of the above-described modules corresponds to a set of instructions for executing a function mentioned above. The above-described modules or programs (i.e., sets of instructions) need not be implemented as separate software programs, procedures, or modules, and thus various subsets of these modules may be combined or otherwise re-arranged in various embodiments. In some embodiments, the memory 130 may store a subset of the modules and data structures described above. Furthermore, the memory 130 may store additional modules and data structures not mentioned above.

Figure 3:
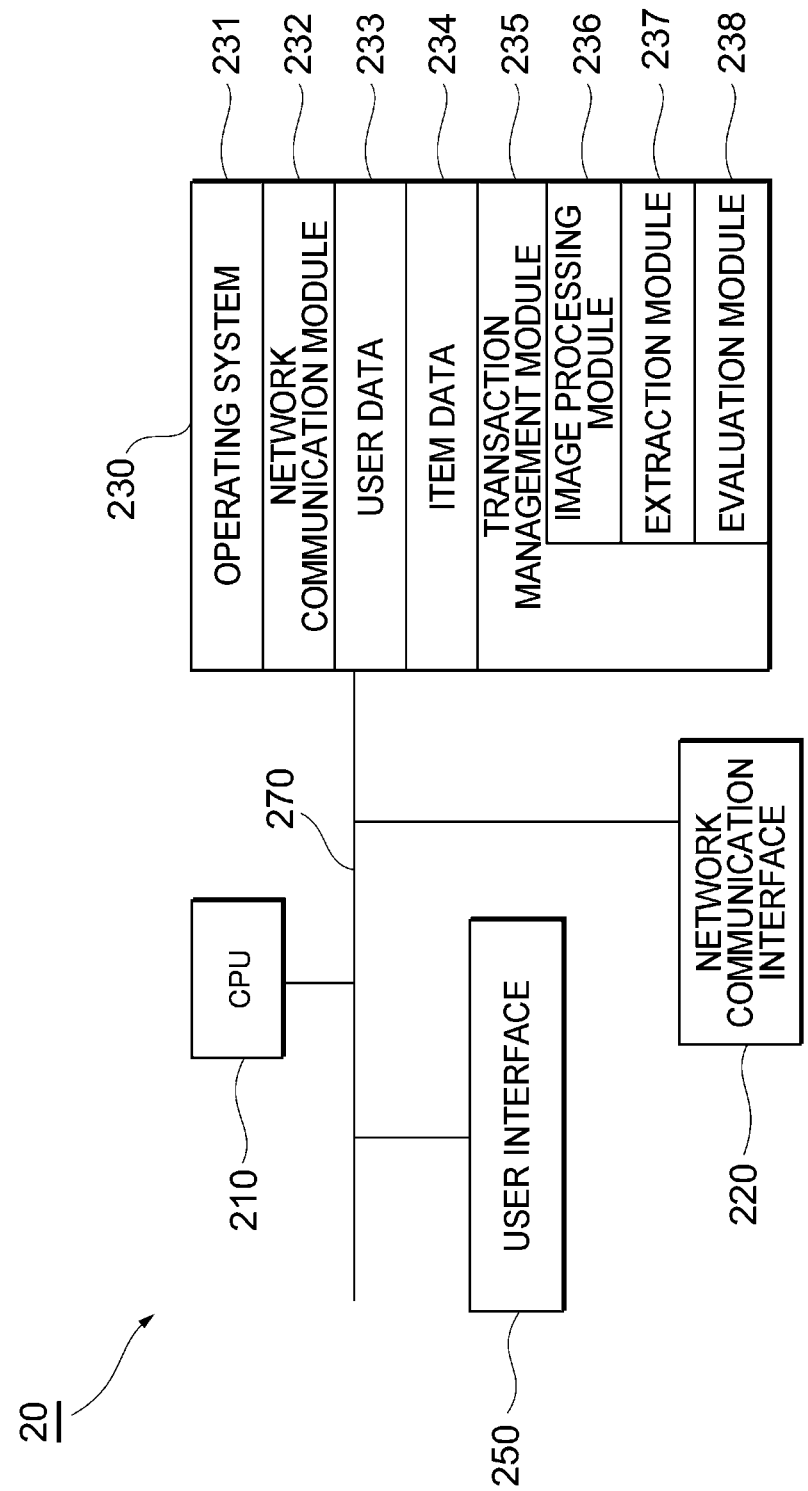
FIG. 3 is a block diagram showing one example of a server 20 according to the embodiment.

FIG. 3 is a block diagram showing one example of the server 20 according to the embodiment. The server 20 includes: one or a plurality of processing devices (CPU) 210; one or a plurality of networks or other communication interfaces 220; a memory 230, and one or a plurality of communication buses 270 for interconnecting these components.

The server 20 may include, in some cases, a user interface 250, which includes a display device (not illustrated) and a keyboard and/or a mouse (or any other input device such as a pointing device, not illustrated).

The memory 230 includes a high-speed random access memory such as DRAM, SRAM, DDR RAM or other random access solid-state storage devices; and it may include a nonvolatile memory such as one or a plurality of magnetic disk storage devices, optical disk storage devices, flash memory devices, or other nonvolatile solid-state storage devices.

In addition, another example of the memory 230 may include one or a plurality of storage devices which is installed remotely from the CPU 210. In some embodiments, the memory 230 stores the following programs, modules, and data structures, or a subset of them.

An operating system 231 includes, for example, a procedure for processing various basic system services and executing a task using hardware.

A network communication module 232 is used, for example, for connecting the server 20 to other computers via one or a plurality of network communication interfaces 220 and one or a plurality of communication networks such as the Internet, other wide-area networks, local area networks, metropolitan area networks, and the like.

User data 233 includes information on users who use the electronic commerce platform. For example, the user data includes a user's name, address, phone number, and the like in association with each user ID. The user data 233 will be described later by using FIG. 5.

Item data 234 includes item information registered in the electronic commerce platform. For example, the item data includes a seller ID, item name, item description (part of item information), price, condition, and the like for each of items listed in the past. The item data 234 will be described later by using FIG. 6.

A transaction management module 235 manages item trade processing on the electronic commerce platform. The transaction management module 235 includes, for example, an image processing module 236, an extraction module 237, and an evaluation module 238, as processing for the user to perform listing.

The image processing module 236 performs pattern matching, object recognition/detection, and the like for one image data piece which is obtained by imaging a first item, so as to identify the first item included in the obtained image data. For example, when the first item is identified, first item information (category, brand, and the like) can be obtained from catalog information of the item.

The extraction module 237 extracts, for the obtained image data, second items matched with or similar to the first item from among items which are registered in the electronic commerce platform, by using the first item information. The extraction module 237 uses a category, brand, condition, and the like as the first item information, thereby allowing improvement in the accuracy of similarities in the second items.

The evaluation module 238 performs sales evaluations for price ranges of the first item based on sales information of each of the second items. For example, the evaluation module 238 groups the second items similar to the first item into items being listed and items sold, and calculates the number of items for each of prices in each group.

Next, the evaluation module 238 calculates the selling probabilities for predetermined prices by using the calculated number of items. Based on this probabilities, the evaluation module 238 evaluates, for example, a price range for 90 percent or higher sellability, as very sellable; a price range for the 60 or higher and less than 90 percent sellability, as easily sellable; a price range for the 40 or higher and less than 60 percent sellability, as possibly sellable; and a price range for the less than 40 percent sellability, as unsellable. The evaluation module 238 performs control to transmit evaluation information on the sales evaluation to another information processing device (for example, the user terminal 10).

It should be noted that the evaluation module 238 may use various evaluation methods. For example, the evaluation module 238 may obtain a selling probability for a predetermined price by using machine learning; and may use various methods for calculating the selling probability.

Each of the components described above may be stored in the one or the plurality of storage devices described above. Each of the modules described above corresponds to a set of instructions for executing a function mentioned above. The above-described modules or programs (i.e., sets of instructions) need not be implemented as separate software programs, procedures, or modules, and thus various subsets of these modules may be combined or otherwise re-arranged in various embodiments. In some embodiments, the memory 230 may store a subset of the modules and data structures described above. Furthermore, the memory 230 may store additional modules and data structures not mentioned above.

The one or the plurality of processing devices (CPU) 210 reads each of the modules from the memory 230 as required, and executes it. For example, the one or the plurality of processing devices (CPU) 210 may execute the network communication module 232 which is stored in the memory 230, thereby constituting a communication unit. In addition, the one or the plurality of processing devices (CPU) 210 may execute the transaction management module 235, the image processing module 236, the extraction module 237, and the evaluation module 238 which are stored in the memory 230, thereby constituting a transaction management unit, an image processing unit, an extraction unit, and an evaluation unit, respectively. Furthermore, processing of each of the transaction management module 235, the image processing module 236, the extraction module 237, and the evaluation module 238 may be executed by the one or the plurality of processing devices (CPU) 210.

Although FIG. 3 shows a "server", FIG. 3 is intended more as description of various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or a plurality of servers.

<One Example of Data Structure>

FIG. 4 is a view showing one example of evaluation information according to the embodiment. In the example shown in FIG. 4, the evaluation information includes an item name, a first price range, a second price range, a third price range, and a fourth price range. The number of price ranges may differ according to items.

The item name "BICYCLE" is associated with the first price range "\1,500-\20,000," the second price range "\20,000-\30,000," the third price range "\30,000-\45,000," and the fourth price range "\45,000 or more." For this item, bicycle, the first price range corresponds to a very sellable price range; the second price range correspond to an easily sellable price range; the third price range corresponds to a possibly sellable price range; and the fourth price range corresponds to an unsellable price range.

FIG. 5 is a view showing one example of the user data 233 according to the embodiment. In the user data 233, information on member users which is created by those who operate and manage the electronic commerce platform is managed. In "USER ID," user identification information (user ID: identifier) for the server 20 to uniquely identifying each user is included. In "USER INFORMATION," personal information of each user such as "NAME", "ADDRESS," and "PHONE NUMBER," is included. The user ID may be included as one item in the user information.

FIG. 6 is a view showing one example of the item data 234 according to the embodiment. In "SELLER ID," a user ID of a selling user is included. In "ITEM NAME," an item name is included. In "DESCRIPTION," descriptions of the category, brand, size, and the like of an item are included. In "PRICE," the sales price of the item is included. It should be noted that "ITEM NAME," "DESCRIPTION," and "PRICE" are included in listing information of the item and the listing information may include other information. In "CONDITION," a condition at the time of listing the item is included. In "STATUS," the status of transaction in electronic commerce is included. The status includes: "transaction in progress" indicating that transaction is currently being performed; "negotiation in progress" indicating that negotiation with a buying user is in progress; "sold" indicating that the item is sold; and the like. In "PURCHASER ID," a user ID of a user who has purchased the item is included.

The data structure described above is just one example and not limited thereto. For example, the item data and transaction data (status, purchaser ID, and the like) may be separately managed.

<Specific Examples of Evaluation>

Figure 7:
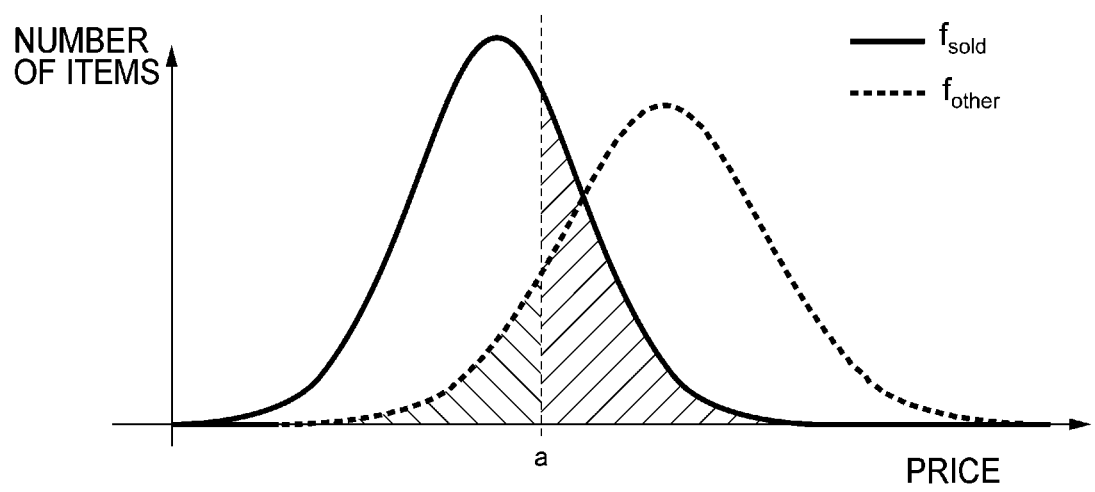
FIG. 7 is a view showing one example of a price statistic according to the embodiment.
Figure 8:
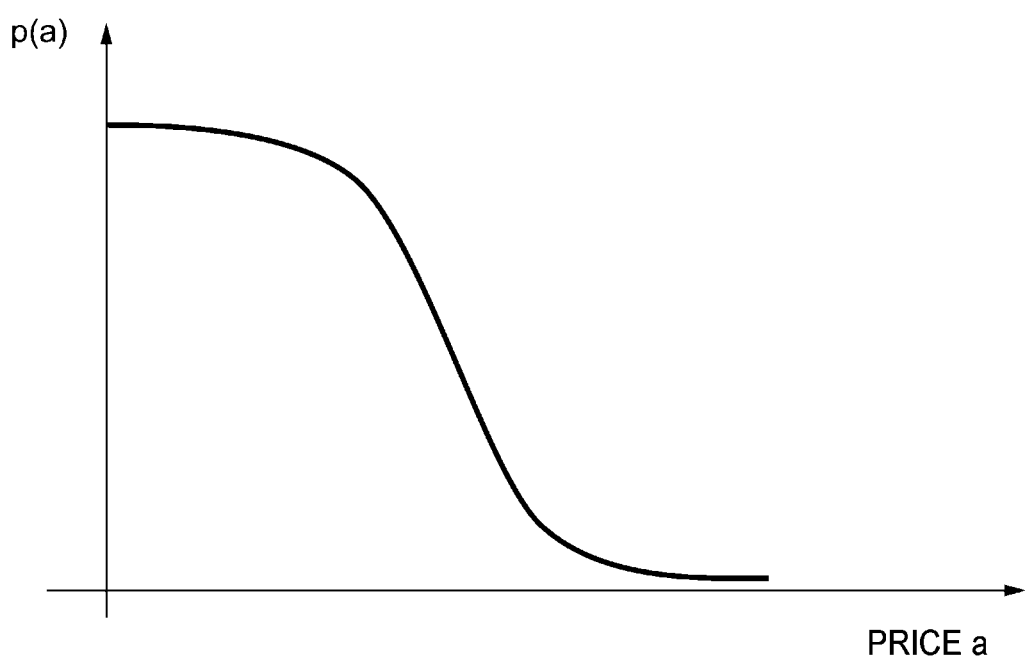
FIG. 8 is a view showing one example of a relationship between a selling probability and a price according to the embodiment.
Figure 9:
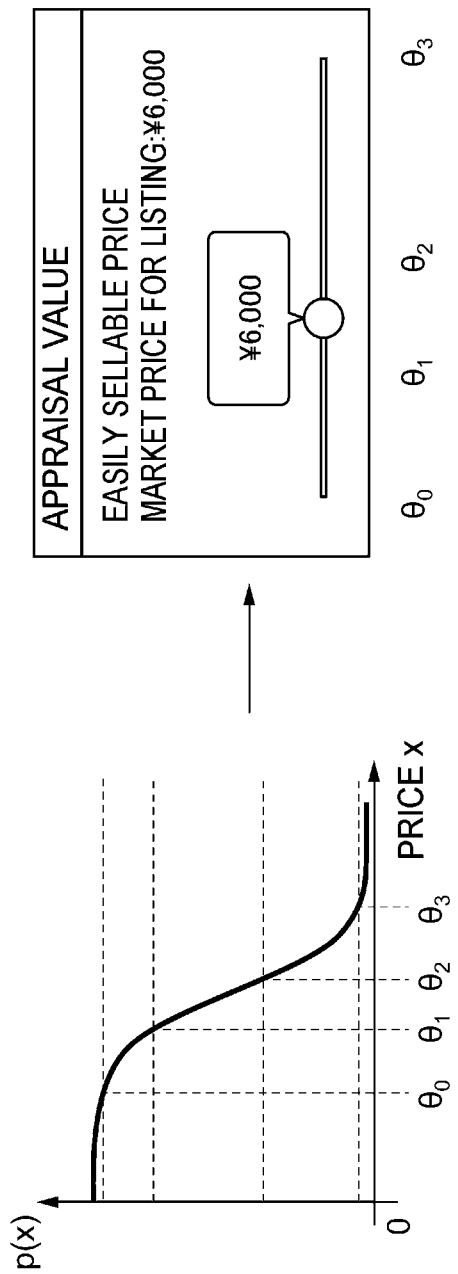
FIG. 9 is a view showing an example of displaying a plurality of regions for price ranges for which evaluations have been performed in the embodiment.

FIGS. 7 to 9 are views for describing specific examples in evaluation processing according to the embodiment. Processing shown in FIGS. 7 to 9 is basically executed by the evaluation module 238. First, the evaluation module 238 classifies the extracted and identified second items into two groups based on whether its transaction is complete, that is, whether the item has been sold. For example, sold items are in a first group and items currently for sale (being listed) are in a second group.

Next, the evaluation module 238 calculates statistics of prices for each of the group. FIG. 7 is a view showing one example of price statistics according to the embodiment. In the example shown in FIG. 7, a graph is rendered where a price is shown on a horizontal axis and the number of items is shown on a vertical axis. In addition, a solid line shows a graph for the first group; and a dotted line shows a graph for the second group.

Here, the evaluation module 238 calculates, based on the graph shown in FIG. 7, the number of items (first item number) in the first group which have been sold at a price a or more; and calculates the number of items (second item number) in the second group which have not been sold even at lower than the price a.

The evaluation module 238 adopts the following expression (1) by using the calculated first item number and second item number, so as to obtain a probability p(a) that an item is sellable at the price a.

[Expression 1]

The evaluation module 238 calculates the ratio of "the number of items sold at the price a or more" to a total of "the number of items sold at the price a or more" and "the number of items unsold even at less than the price a." The evaluation module 238 determines the probability p(a) by varying this price a from the lowest price to the highest price, thereby allowing a relationship between a selling probability and a price shown in FIG. 8 to be represented.

FIG. 8 is a view showing one example of the relationship between a selling probability and a price according to the embodiment. The evaluation module 238 determines threshold values for the price by using the graph shown in FIG. 8. For example, the evaluation module 238 sets threshold values at which the respective probabilities of having been sold are 99% (=θ0), 70% (=θ1), 30% (=θ2), and 10% (=θ3), thereby allowing separation of price ranges between the threshold values.

For example, the evaluation module 238 evaluates a price in a price range from θ0 to θ1 as a "very sellable price;" evaluates a price in a price range from θ1 to θ2 as a "easily sellable price;" and evaluates a price in a price range from θ2 to θ3 as an "unsellable price."

FIG. 9 is a view showing an example of displaying a plurality of regions for the price ranges for which evaluation has been performed in the embodiment. The display control module 137 of the user terminal 10 controls to display a screen shown in FIG. 9 on a screen of the user terminal 10.

In the example shown in FIG. 9, a slider is used; and in a slider bar region which corresponds to each of the price ranges, a text of an evaluation result and each different color are allocated. The lowest price for the slider is a price corresponding to θ0 which is the highest threshold value; and the highest value is a price corresponding to θ3 which is the lowest threshold value. This is for the purpose of eliminating prices such as 0 yen and an inordinately high price which users will not set.

In addition, as shown in FIG. 9, the price a can be changed by using the slider on a side of the user terminal 10. When the price a is changed, a text allocated according to each of the threshold values is dynamically rendered and the color of a knob on the slider is changed.

It should be noted that although a calculation method for the selling probability has been described by using the expression (1) as an example, it is not limited thereto and other calculation methods may be used. In addition, it is not limited to expressions; and it may be possible that a model for determining a selling probability by using machine learning is generated and the selling probability is determined by using this model.

<Operation Description>

Figure 10:
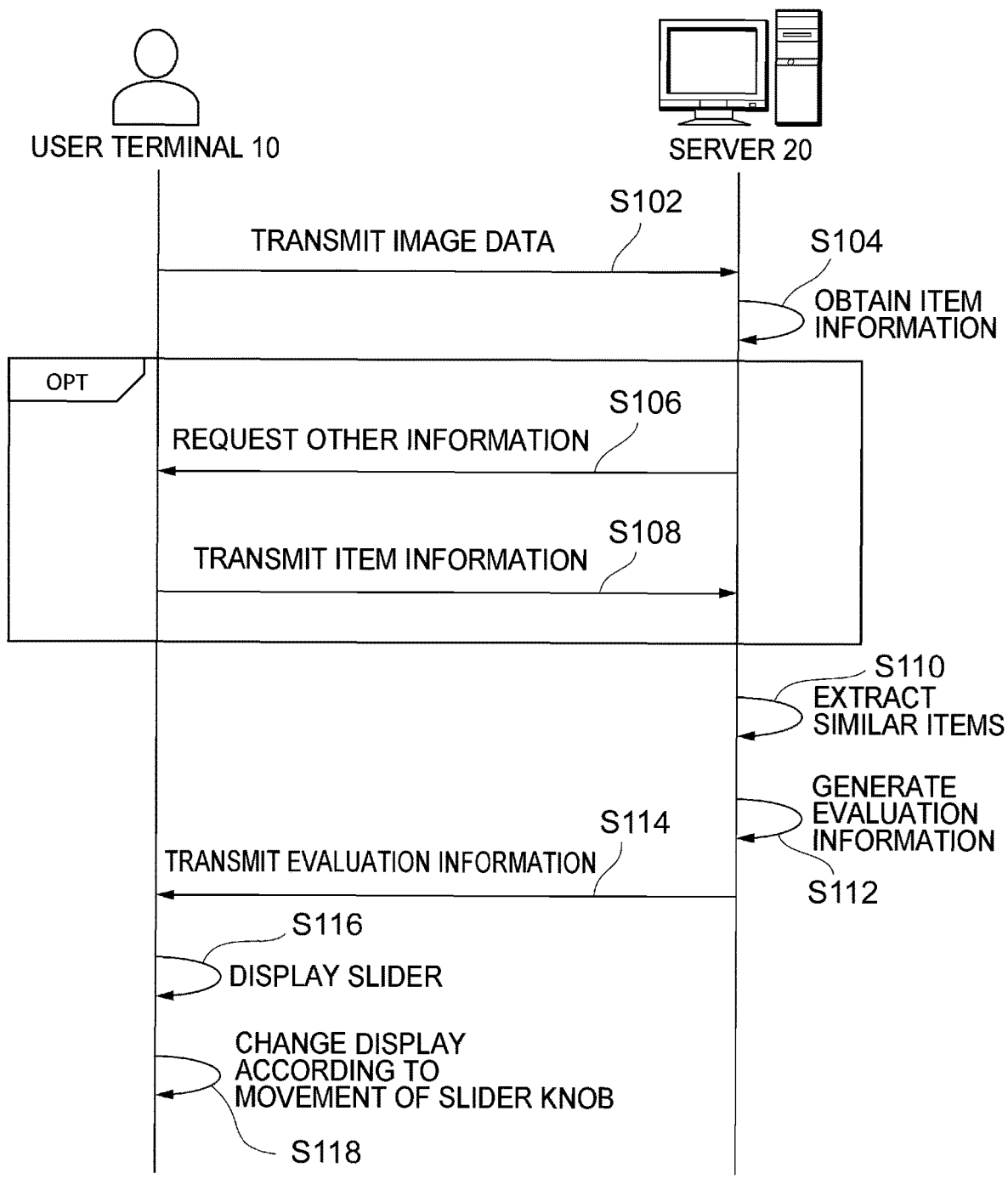
FIG. 10 is a sequence diagram showing one example of processing of the information processing system 1 according to the embodiment.

Next, the operation of the information processing system 1 according to the embodiment will be described. FIG. 10 is a sequence diagram showing one example of processing of the information processing system 1 according to the embodiment.

(Step S102)

When obtaining image data including an item from the imaging device 160, the acquisition module 135 of the user terminal 10 performs control to transmit the image data to the server 20 by using the network communication module 132.

(Step S104)

The image processing module 236 of the server 20 detects an object from the obtained image data and recognizes it, thereby obtaining item information of the object. If predetermined items (for example, category, brand, and the like) are obtained as the item information, steps S106 and S108 can be skipped. If the image processing module 236 cannot obtain the predetermined items of the item information, a process proceeds to step S106.

(Step S106)

The image processing module 236 of the server 20 requests the user terminal 10 to input the predetermined items of the item information.

(Step S108)

The acquisition module 135 of the user terminal 10 performs control to display an input screen for the item information including the predetermined items in response to a request from the server 20; and obtains the item information including the predetermined items based on a user input. The obtained item information including the predetermined items is transmitted to the server 20.

(Step S110)

The extraction module 237 of the server 20 extracts items similar to the first item from the item data 234, based on the obtained image data and item information.

(Step S112)

The evaluation module 238 of the server 20 generates evaluation information including whether the first item is sellable or unsellable for prices, using the extracted items by the evaluation method described in FIGS. 7 to 9.

(Step S114)

The evaluation module 238 of the server 20 performs control to transmit the generated evaluation information to the corresponding user terminal 10 by using the network communication module 232. For example, the evaluation information includes: price information including the lowest price and highest price of the first item; and threshold information indicating each threshold value for which an index for sellability changes.

(Step S116)

The display control module 137 of the user terminal 10 performs control to display sales evaluations for the price ranges of the first item by using a plurality of regions identifiably on a screen, based on the obtained evaluation information. For example, the display control module 137 performs control to display a result of an evaluation for the sellability for a predetermined price, by using the slider as the display object (for example, see the right screen in FIG. 9). Initialization processing on slider display will be described in detail by using FIG. 11.

(Step S118)

The display control module 137 of the user terminal 10 may change, when the slider knob is operated by the user, the display of the evaluation result according to the movement of the knob. Display change processing according to the movement of the knob will be described in detail by using FIG. 12.

Thus, the user terminal 10 identifiably displays, on the screen, sellability, unsellability, and the like according to price ranges based on the received evaluation information by using the slider, or the like; thereby allowing a mechanism to be provided that facilitates appropriate pricing for an item to be listed for sale on the electronic commerce platform.

Figure 11:
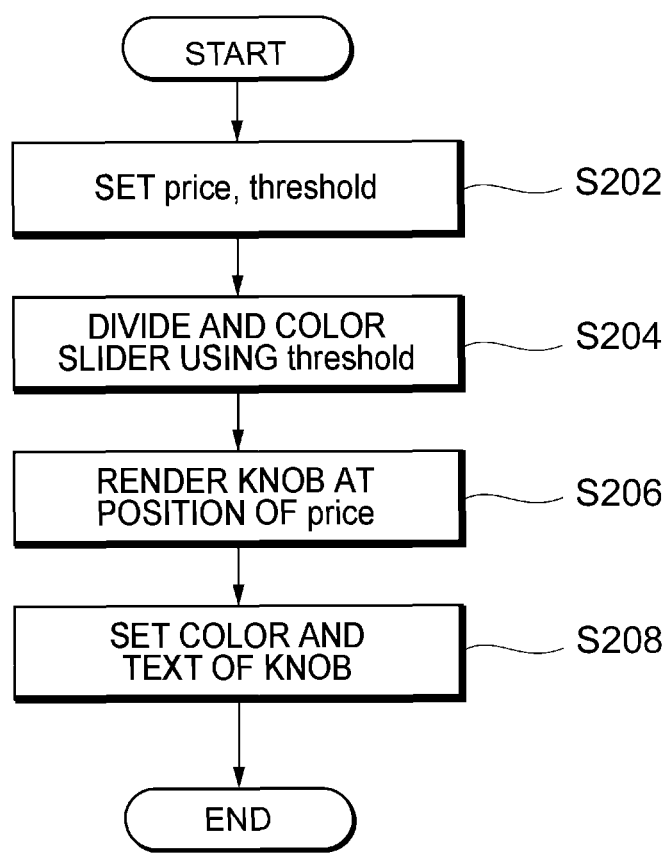
FIG. 11 is a flowchart showing one example of slider setting processing according to the embodiment.

FIG. 11 is a flowchart showing one example of slider setting processing according to the embodiment. A process shown in FIG. 11 is executed after the display control module 137 of the user terminal 10 obtains evaluation information.

(Step S202)

The display control module 137 sets price information displayed on the screen; and sets a lowest price and a highest price so as to assign the lowest price and highest price included in the evaluation information to end parts of the slider. In addition, the display control module 137 also sets threshold values (threshold information) and performs assignment of threshold information included in the evaluation information.

(Step S204)

The display control module 137 divides the slider into a plurality of regions by using the threshold information and assigns a different color to each of the regions.

(Step S206)

The display control module 137 renders a slider knob at a position of a predetermined price (price of the price information) to be displayed. The predetermined price is, for example, an average price, a median price, or the like.

(Step S208)

The display control module 137 makes settings for knob colors and texts such that a color of a corresponding region is assigned and an evaluation result of a corresponding price is assigned to a text.

Execution of the above initialization processing allows the user terminal 10 to adaptively change the display of the slider for each item, based on the evaluation information obtained from the server 20.

Figure 12:
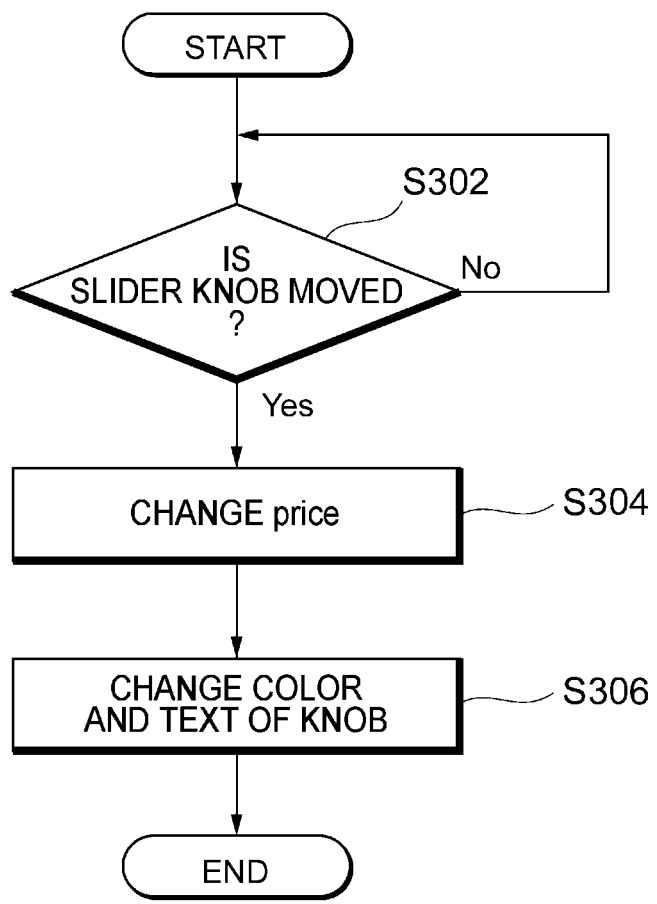
FIG. 12 is a flowchart showing one example of change processing involved in movement of a slider knob according to the embodiment.

FIG. 12 is a flowchart showing one example of change processing in association with the movement of the slider knob according to the embodiment. A process shown in FIG. 12 is executed when the user moves the knob on the screen of the user terminal 10.

(Step S302)

The display control module 137 of the user terminal 10 determines whether the slider knob has been moved. If the knob has been moved (step S302: YES), the process proceeds to step S304; and if the knob has not been moved (step S302: NO), the process returns to step S302.

(Step S304)

The display control module 137 changes a price being displayed (price of the price information) to a price corresponding to the position of the knob after the movement.

(Step S306)

The display control module 137 changes a knob color and a text (for example, a result of evaluation on sellability for a price) according to the position of the knob after the change.

Thus, by moving the slider knob, the user can check an evaluation result for sellability which is displayed as a text and can check the color of the knob, thereby being able to easily perform pricing.

Figure 13:
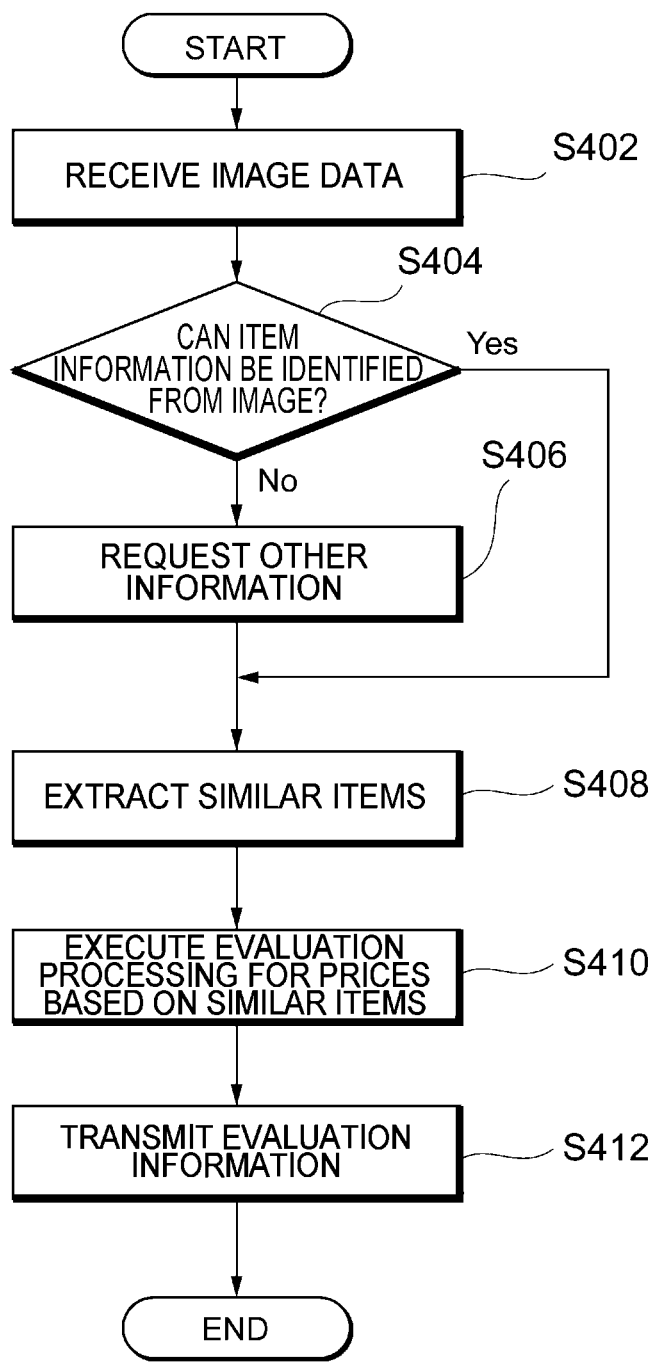
FIG. 13 is a flowchart showing one example of processing of a server 20 according to the embodiment.

FIG. 13 is a flowchart showing one example of processing of the server 20 according to the embodiment. A process shown in FIG. 13 is executed by transmission of image data of the first item from the user terminal 10.

(Step S402)

The network communication module 232 of the server 20 receives image data including an item from the user terminal 10.

(Step S404)

The image processing module 236 of the server 20 detects an object from the received image data and recognizes it, thereby determining whether item information of the object can be identified. For example, if the image processing module 236 has identified predetermined items (for example, a category, a brand, and the like) of the item information (step S404: YES), the process proceeds to step S408; and if it has not identified the predetermined items (step S404: NO), the process proceeds to step S406.

(Step S406)

The image processing module 236 of the server 20 requests the user terminal 10 to input item information including the unidentified predetermined items of the item information.

(Step S408)

The extraction module 237 of the server 20 extracts items similar to the first item from the item data 234, based on the obtained image data and item information.

(Step S410)

The evaluation module 238 of the server 20 generates evaluation information including whether the first item is sellable or unsellable for prices, using the extracted items by the evaluation method described in FIGS. 7 to 9.

(Step S412)

The evaluation module 238 of the server 20 performs control to transmit the generated evaluation information to the corresponding user terminal 10 by using the network communication module 232. For example, the evaluation information includes: price information including the lowest price and highest price of the first item; and threshold information indicating each threshold value for which an index for sellability changes.

Thus, sellability for the prices of the first item can be evaluated on the server 20 side, thereby allowing the user terminal 10 to be provided with beneficial information on pricing at the time of listing.

<Screen Example>

Figure 14:
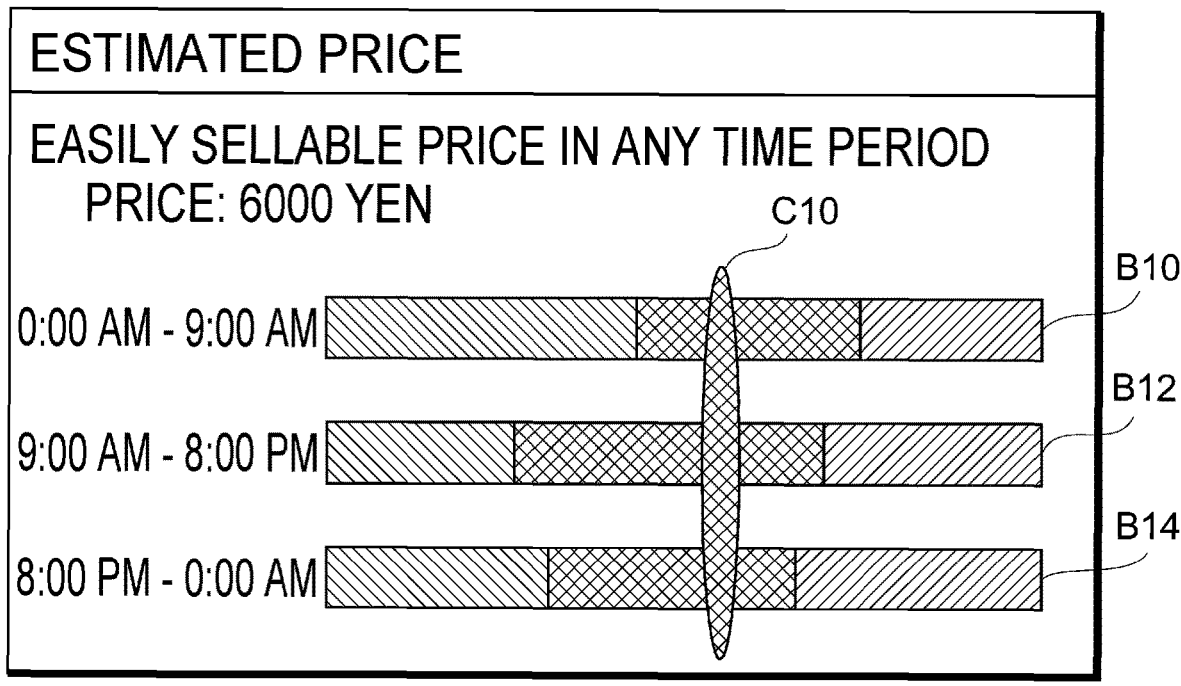
FIG. 14 is a view showing a screen example A according to the embodiment.

Next, an example of display on the screen of the user terminal 10 will be described. FIG. 14 is a view showing a screen example A according to the embodiment. As shown in FIG. 14, sliders B10, B12, and B14 including a plurality of identifiable regions are displayed for each time period on the screen example A.

In addition, a knob C10 is displayed in a shape of vertically crossing the sliders; otherwise, a knob may be prepared for each of the sliders. The knob C10 corresponds to the colors and patterns of slider regions at a corresponding position. In addition, the text of "easily sellable price in any time periods" is changed according to the position of the knob C10 and the price of 6000 yen is also changed according to the position of the knob C10. It should be noted that the number of time periods and the number of identifiable regions in the sliders are not limited to those in the example shown in FIG. 14.

Figure 15:
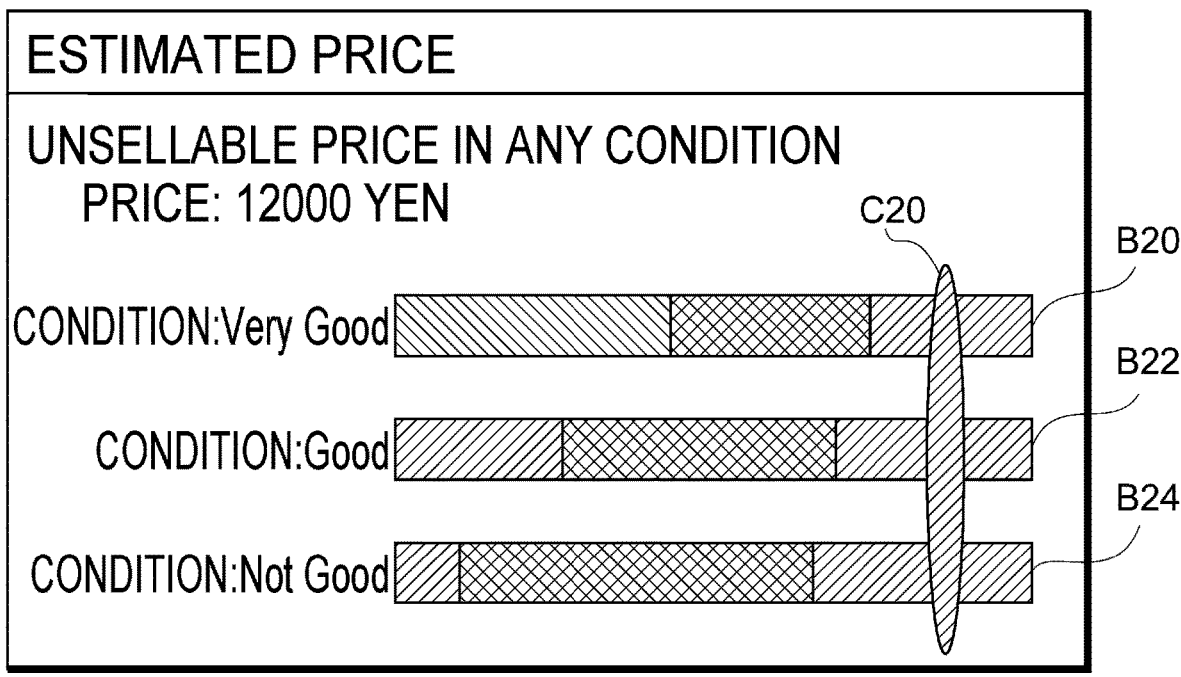
FIG. 15 is a view showing a screen example B according to the embodiment.

FIG. 15 is a view showing a screen example B according to the embodiment. As shown in FIG. 15, sliders B20, B22, and B24 including a plurality of identifiable regions are displayed for each condition on the screen example B.

In addition, a knob C20 is displayed in a shape of vertically crossing the sliders; otherwise, a knob may be prepared for each of the sliders. The knob C20 corresponds to the colors and patterns of slider regions at a corresponding position. In addition, the text of "unsellable price in any conditions" is changed according to the position of the knob C20 and the price of 12000 yen is also changed according to the position of the knob C20. It should be noted that the number of conditions and the number of identifiable regions in the sliders are not limited to those in the example shown in FIG. 15.

In addition, it should be noted that the disclosed technology is not limited to the embodiments described above and may be embodied in a variety of other forms without departing from the spirit of the disclosed technology. Therefore, the above embodiments are merely exemplifications in all respects and are not construed restrictively. For example, the process steps described above can be executed in any order or in parallel to the extent that no contradiction occurs in processing contents.

Programs according to the embodiments of the present disclosure may be provided in a state of being stored in a computer-readable storage medium. The storage medium is capable of storing the programs in "non-transitory tangible media." The programs include, not as limitations but as examples, a software program and a computer program.

[Modification]

Furthermore, a modification of the above embodiments will be described below.

<Modification>

In the modification, a price displayed on the screen in each of the above embodiments may be a price minus a fee on the electronic commerce platform. In addition, the price displayed on the screen may be a price minus an estimated delivery charge. Furthermore, as for sellability, a selling probability may be displayed as text on the screen. In this case, a selling probability according to the position of a slider knob is displayed; and in a plurality of regions for price ranges, a slider is identifiably displayed by, for example, color gradation according to prices. In addition, in the above embodiments, item data similar to the first item is extracted from the obtained data; however, it is not limited thereto, and the first item may be identified from identification information such as the model number of the first item.

CROSS-REFERENCE TO RELATED APPLICATION

The present application is based on Japanese Patent Application Number 2019-161755 filed on Sep. 5, 2019, the contents of which are incorporated by reference herein.

What is claimed is:

1. An information processing method, wherein one or a plurality of processors included in an information processing device performs:

obtaining first item information of a first item to be listed for sale by a user;

performing sales evaluations for price ranges of the first item and obtaining evaluation information on the sales evaluations, the sales evaluations being performed based on sales information of second items matched with or similar to the first item, the sales information including sales prices when the second items have been sold on an electronic commerce platform, the second items being extracted by using the first item information from among items registered in the electronic commerce platform, the evaluation information including information of evaluated salability at each of the plurality of price range of the first item;

performing control to display the sales evaluations of the salability for the each of the plurality of price ranges of the first item by using a plurality of regions identifiably on a screen, based on the evaluation information, wherein the performing control to display includes:

performing control to display an object on the plurality of regions, the object being movable on the plurality regions; and performing control to display on the screen, an evaluation result of salability of the first item for a price according to a position of the object moving by an operation of the user; and by an operation of the user to a listing button displayed on the screen, setting a price corresponding to the position of the object to a price of the first item and performing listing processing of the first item.

2. The information processing method according to claim 1, wherein the performing control to display changes distinctiveness of the object according to distinctiveness of a region of a position corresponding to the position of the object.

3. The information processing method according to claim 1, wherein
the obtaining includes obtaining, for each of a plurality of time periods, evaluation information corresponding to the time period; and
the performing control to display includes performing control to identifiably display the plurality of regions for the time period, based on the corresponding evaluation information.

4. The information processing method according to claim 1, wherein
the obtaining includes obtaining, for each of a plurality of conditions of the first item, evaluation information corresponding to the condition; and
the performing control to display includes performing control to identifiably display the plurality of regions for the condition of the first item, based on the corresponding evaluation information.

5. The information processing method according to claim 1, wherein
the performing control to display represents distinctiveness of the plurality of regions by using different color information or character information.

6. A computer-readable non-transitory storage medium storing a program, wherein the program causes one or a plurality of processors included in an information processing device to perform:
obtaining first item information of a first item to be listed for sale by a user;
performing sales evaluations for price ranges of the first item and obtaining evaluation information on the sales evaluations, the sales evaluations being performed based on sales information of second items matched with or similar to the first item, the sales information including sales prices when the second items have been sold on an electronic commerce platform, the second items being extracted by using the first item information from among items registered in the electronic commerce platform, the evaluation information including information of evaluated salability at each of the plurality of price range of the first item;
performing control to display the sales evaluations of the salability for the each of the plurality of price ranges of the first item by using a plurality of regions identifiably on a screen, based on the evaluation information, wherein the performing control to display includes:
performing control to display an object on the plurality of regions, the object being movable on the plurality regions; and
performing control to display, on the screen, an evaluation result of salability of the first item for a price according to a position of the object moving by an operation of the user; and
by an operation of the user to a listing button displayed on the screen, setting a price corresponding to the position of the object to a price of the first item and performing listing processing of the first item.

7. An information processing device including one or a plurality of processors, wherein the one or the plurality of processors performs:
obtaining first item information of a first item to be listed for sale by a user;
performing sales evaluations for price ranges of the first item and obtaining evaluation information on the sales evaluations, the sales evaluations being performed based on sales information of second items matched with or similar to the first item, the sales information including sales prices when the second items have been sold on an electronic commerce platform, the second items being extracted by using the first item information from among items registered in the electronic commerce platform, the evaluation information including information of evaluated salability at each of the plurality of price range of the first item;
performing control to display the sales evaluations of the salability for the each of the plurality of price ranges of the first item by using a plurality of regions identifiably on a screen, based on the evaluation information, wherein the performing control to display includes:
performing control to display an object on the plurality of regions, the object being movable on the plurality regions; and
performing control to display, on the screen, an evaluation result of salability of the first item for a price according to a position of the object moving by an operation of the user; and
by an operation of the user to a listing button displayed on the screen, setting a price corresponding to the position of the object to a price of the first item and performing listing processing of the first item.

8. An information processing method, wherein one or a plurality of processors included in an information processing device performs:
obtaining first item information of a first item to be listed for sale by a user from another information processing device;
extracting second items matched with or similar to the first item from among items registered in an electronic commerce platform, by using the first item information;
performing sales evaluations for price ranges of the first item based on sales information of the second items, the sales information including sales prices when the second items have been sold on an electronic commerce platform, the sales evaluations including evaluating salability of the first item at each of the plurality of price range of the first item;
performing control to transmit screen information including evaluation information on the sales evaluations to the other information processing device, the evaluation information including information of evaluated salability at each of the plurality of price range of the first item by using a plurality of regions identifiably on a screen of the other information processing device, wherein transmitting the screen information:
transmitting the screen information to display an object on the plurality of regions, the object being movable on the plurality region; and when a position of the object moves by an operation of the user, an evaluation result is displayed on the screen, the evaluation result being a result of salability of the first item for a price according to the position of the moved object; and in response to an operation of the user to a listing button displayed on the screen of the other information processing device, performing listing processing of the first item whose price is set to a price corresponding to a current position of the object.

* * * * *